United States Patent [19]
Boutaghou

[11] Patent Number: 5,870,251
[45] Date of Patent: Feb. 9, 1999

[54] TAPERLESS/CROWN FREE/AIR BEARING DESIGN

[75] Inventor: Zine-Eddine Boutaghou, Vadnais Heights, Minn.

[73] Assignee: Seagate Technology, Inc., Scotts Valley, Calif.

[21] Appl. No.: 849,476
[22] PCT Filed: Apr. 14, 1997
[86] PCT No.: PCT/US97/06143
§ 371 Date: Jun. 9, 1997
§ 102(e) Date: Jun. 9, 1997

[51] Int. Cl.⁶ .............................. G11B 5/60; G11B 21/21
[52] U.S. Cl. .......................................................... 360/103
[58] Field of Search ....................................... 360/103, 102

[56] References Cited

U.S. PATENT DOCUMENTS

| | | | |
|---|---|---|---|
| 4,646,180 | 2/1987 | Ohtsubo | 360/103 |
| 5,067,037 | 11/1991 | Ananth et al. | 360/103 |
| 5,079,657 | 1/1992 | Aronoff et al. | 360/103 |
| 5,162,073 | 11/1992 | Aronoff et al. | 156/625 |
| 5,200,867 | 4/1993 | Albrecht et al. | 360/103 |
| 5,267,104 | 11/1993 | Albrecht et al. | 360/97.02 |
| 5,285,337 | 2/1994 | Best et al. | 360/103 X |
| 5,287,235 | 2/1994 | Cunningham et al. | 360/103 |
| 5,345,353 | 9/1994 | Kranz et al. | 360/103 |
| 5,386,666 | 2/1995 | Cole | 451/5 |
| 5,396,387 | 3/1995 | Murray | 360/103 |
| 5,418,667 | 5/1995 | Best et al. | 360/103 |
| 5,424,888 | 6/1995 | Hendricks et al. | 360/103 |
| 5,499,149 | 3/1996 | Dovek | 360/103 |
| 5,515,219 | 5/1996 | Ihrke et al. | 360/103 |
| 5,537,273 | 7/1996 | Hendriks et al. | 360/103 |
| 5,550,693 | 8/1996 | Hendriks et al. | 360/103 |
| 5,636,087 | 6/1997 | Matsuzaki et al. | 360/103 |

FOREIGN PATENT DOCUMENTS

| | | |
|---|---|---|
| 56-107363 | 8/1981 | Japan . |
| 60-47278 | 3/1985 | Japan . |
| 3-241577 | 10/1991 | Japan . |
| 8-69674 | 3/1996 | Japan . |
| 8-212740 | 8/1996 | Japan . |
| 8-287440 | 11/1996 | Japan . |

Primary Examiner—John H. Wolff
Attorney, Agent, or Firm—Westman, Champlin & Kelly, P.A.

[57] ABSTRACT

An air bearing slider (140) for use in a disc drive (10) is disclosed. The slider includes leading and trailing edges (44,46) and an air bearing surface (48) having a longitudinally extending center line (40). A first leg (102) protrudes from the leading edge end of the air bearing surface on a first side of the center line. The first leg extends longitudinally along a first axis (103) oriented such that it forms an angle relative to the center line which is substantially equal to the skew angle of the slider when the slider is positioned at the inner diameter (36) of the disc.

18 Claims, 9 Drawing Sheets

TAPERLESS/CROWN FREE/AIR BEARING DESIGN

BACKGROUND OF THE INVENTION

The present invention relates generally to disc drive data storage systems. More particularly, the present invention relates to a slider air bearing surface design which results in improved take-off characteristics and which eliminates the need for a taper at the leading edge end of the air bearing surface.

Disc drive data storage devices are well-known in the industry. In certain types of disc drives, digital data is written to and read from a thin layer of magnetizable material on the surface of rotating discs. Write and read operations are performed through one or more transducers which are carried in a slider body. The slider and transducer(s) are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes a self-acting hydrodynamic air bearing surface (ABS). As the disc rotates, the disc pulls a very thin layer of air beneath the ABS, which develops a lifting force that causes the slider to lift and "fly" several μinches above the disc surface.

Stiction forces adversely affect contact start and stop (CSS) performance of the slider, and may be high enough to prevent the spindle motor from rotating the disc prior to the head slider take-off from the surface of the disc. One method of reducing the stiction and improving CSS performance is to lap a crown along the length of the ABS by pressing the slider against a spherically shaped lapping plate. A crowned ABS reduces collection of lubrication between the slider and the disc. However, more complete solutions to reducing stiction are desired.

Since the introduction of a taper at the leading edge of the ABS, head take-off has improved, thus improving CSS performance dramatically. The air flow entrapped in the taper permits the air bearing film to start forming at the leading edge of the slider. Progressively, the air bearing forms around all of the rails to encompass the trailing edge area. However, machining of the taper region is not a precise process and requires removal of a large amount of material. Tolerances on the taper region impact the fly height mean and sigma of the ABS, rendering some air bearing concepts impractical due to their sensitivity to the taper length and/or shape. The surface finish requirement of the taper region is less stringent than the remaining ABS, raising concerns about head rocking leading to taper-to-media contact during the take-off process. As the size of sliders continues to decrease in the industry, it becomes a greater challenge to control the geometrical properties (for example, taper and crown) of the slider.

SUMMARY OF THE INVENTION

An air bearing slider for use in a disc drive data storage system is disclosed. The slider includes a leading edge, a trailing edge and an air bearing surface opposed to the surface of the disc. The air bearing surface includes an inner rail and an outer rail on opposite sides of a longitudinally extending center line. First and second leg members protrude from the air bearing surface at a leading edge end of the slider on first and second sides of the center line, respectively. Third and fourth leg members protrude from the air bearing surface at a trailing edge end of the slider on the first and second sides of the center line, respectively. The first and second leg members protrude from the leading edge end of the slider a first distance. The third and fourth leg members protrude from the trailing edge end of the slider a second distance. The second distance is less than the first distance such that the leading edge end of the slider is elevated above the surface of the disc more than the trailing edge end of the slider while the disc is at rest, thus giving the slider a static pitch.

In some preferred embodiments, the first leg member extends longitudinally along a first axis oriented such that it forms an angle relative to the center line which is substantially equal to the skew angle of the slider when the slider is positioned at the inner diameter of the disc, thereby optimizing air flow to the air bearing surface prior to take-off. The second, third and fourth leg members can likewise extend longitudinally along second, third and fourth axes oriented such that they form angles relative to the center line which are substantially equal to the skew angle of the slider when the slider is positioned at the inner diameter of the disc.

DETAILED DESCRIPTION OF THE PREFERRED EMBODIMENTS

Figure 1:
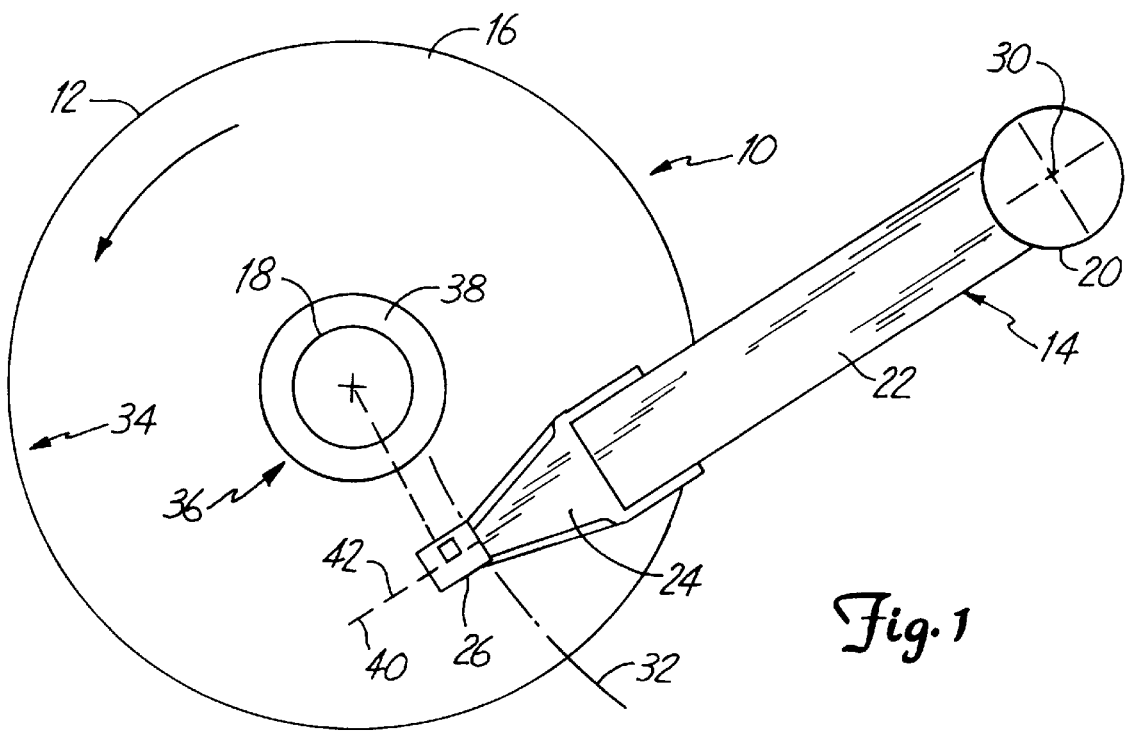
FIG. 1 is a top view of a magnetic disc and an actuator which moves a head slider of the present invention through an arc between an outer diameter of the disc and an inner diameter of the disc.

A disc drive assembly 10, shown in the top view of FIG. 1, comprises a disc pack 12 and E-block assembly 14. Disc pack 12 comprises discs 16 stacked on a spindle drive 18. E-block assembly 14 comprises spindle 20 and a plurality of support arms 22. Each support arm 22 carries one or two flexure arms 24. Each flexure arm 24 carries a magnetic head slider 26. Each flexure arm 24 is mounted to its corresponding support arm 22. Although the present invention is contemplated for use with disc drives having multiple discs, the present invention is hereafter described with reference to a single head slider and a single disc.

Spindle 20 is rotated about pivot axis 30 in order to move head slider 26 mounted at the tip of flexure arm 24 through arc 32. As disc 16 rotates beneath head slider 26, this pivoting motion allows head slider 26 to change track positions on discs 16. Head slider 26 can be moved across disc 16 from outer diameter 34 to inner diameter 36. Contact start-stop (CSS) region 38 is included at inner diameter 36 of disc 16. At one location on disc 16, between outer diameter 34 and inner diameter 36, center line 40 of head slider 26 will be co-linear with tangent 42 of a circular data track on disc 16 beneath the head slider 26.

Figure 2:
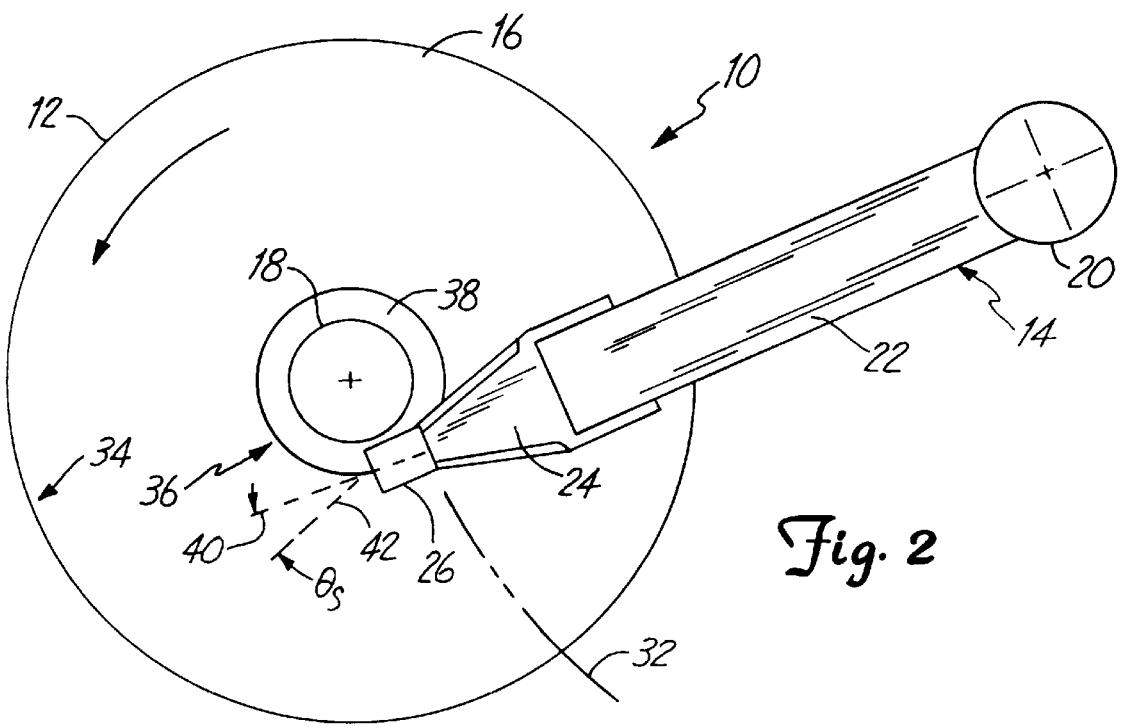
FIG. 2 is a top view of the disc and actuator illustrated in FIG. 1, which shows the head slider of the present invention positioned at the inner diameter of the disc such that it forms a skew angle with a tangent to concentric data tracks on the disc.

As illustrated diagrammatically in the top view of FIG. 2, when head slider 26 is positioned near CSS region 38 at inner diameter 36, center line 40 of head slider 26 forms skew angle $\theta_S$ with data track tangent 42. In the absence of data tracks in this region of the disc, tangent 42 can be defined as a tangent to a circle which is concentric to the data tracks. It must be noted that this is only one manner in which skew angle $\theta_S$ can be defined. Other definitions are commonly used in the industry. As used herein, tangent 42 is intended to represent the general direction of air flow caused by the rotation of disc 16 which will be used to create the air bearing film needed to allow head slider 26 to take-off fly above the surface of disc 16.

Figure 3:
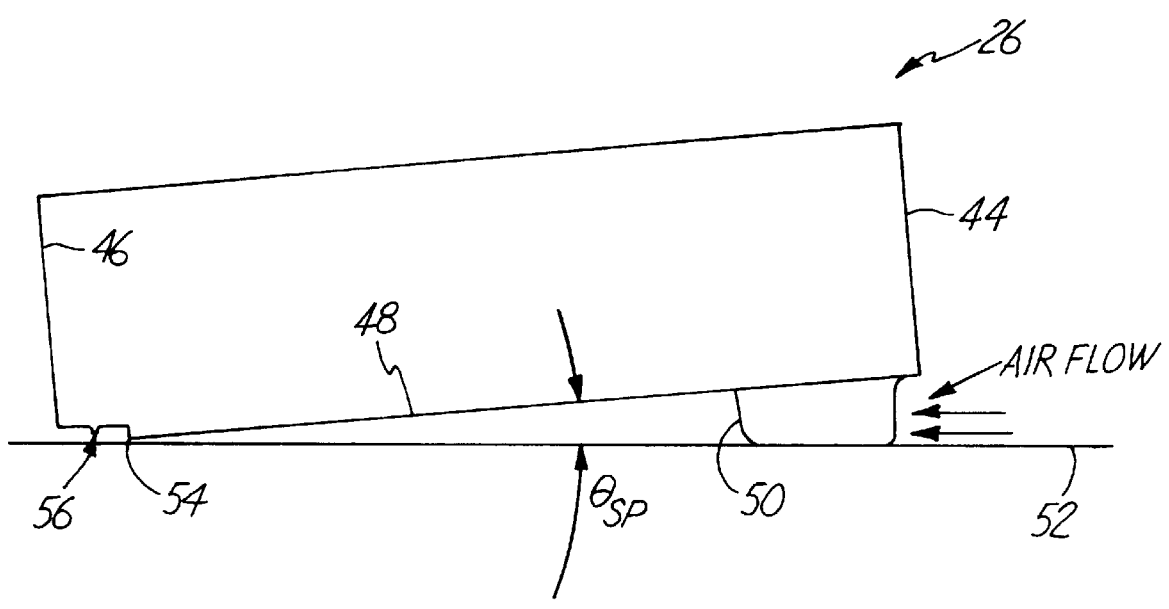
FIG. 3 is a side view illustrating a taperless head slider in accordance with preferred embodiments of the present invention.

FIG. 3 illustrates head slider 26 in accordance with preferred embodiments of the present invention. Head slider 26 includes leading edge 44, trailing edge 46, ABS 48 and longitudinally extending leg members (protrusions, extensions, or features) 50. Leg members 50 extend from the leading edge end of ABS 48 by between about 4 μinches and 12 μinches, thus causing ABS 48 to form a static pitch angle $\theta_{SP}$ with surface 52 of disc 16 when disc 16 is not rotating and head slider 26 is at rest on surface 52. By elevating leading edge 44 above surface 52 of the disc, air flow is permitted between leg members 50 and against ABS 48 at the trailing edge end. This allows head slider 26 to be a taperless head slider. This is highly beneficial and allows ABS 48 of head slider 26 to be designed for optimal flying characteristics, and not for enhanced take-off characteristics. By permitting air flow beneath head slider 26, which rests on leg members 50 and corner 54 near trailing edge 46 and transducer 56, conventional head slider take-off features (i.e., taper and crown) can be decoupled from head slider characteristics which optimize the flying performance.

While leg members 50 allow ABS 48 to remain taper free, they contribute to tipping of ABS 48 by an angle given by:

slope=protrusion height/length of rails

The effective stationary pitch $\theta_{SP}$ of head slider 26 will preferably be between about 50 μrad and about 100 μrad. The maximum height of leg members 50 must be less than the fly height of leading edge 44. Therefore, the height of leg members 50 will preferably be between about 4 μinches and about 12 μinches, depending upon the pitch angle of ABS 48 while head slider 26 is flying. During flight, head slider 26 tilts around trailing edge 46 with leg members 50 extending from the leading edge end of ABS 48. The effect of the tilting will allow air flow to penetrate into ABS 48, thus enabling air flow to form the air bearing film.

As discussed above, the role of leg members 50 is to form a slider pitch $\theta_{SP}$ of between 50 and 100 μrad during static rest of head slider 26 on surface 52 of the disc. By forcing contact between head slider 26 and surface 52 of the disc at trailing edge corner 54 and at leg members 50 near leading edge 44, air flow is allowed to enter ABS 48 without the use of a taper. The middle region of ABS 48 between leading edge 44 and trailing edge 46 is not in contact with surface 52 during CSS, which nullifies or reduces the complex role of crown/camber/twist on the performance of the air bearing. De-coupling CSS performance from the role of crown/camber/twist allows ABS 48 to be designed for optimal fly height performance, and not for enhanced CSS performance. At a minimum, the stringent requirements on crown/camber/twist which have previously existed in head slider designs are eliminated with the head slider design of the present invention.

Figure 4:
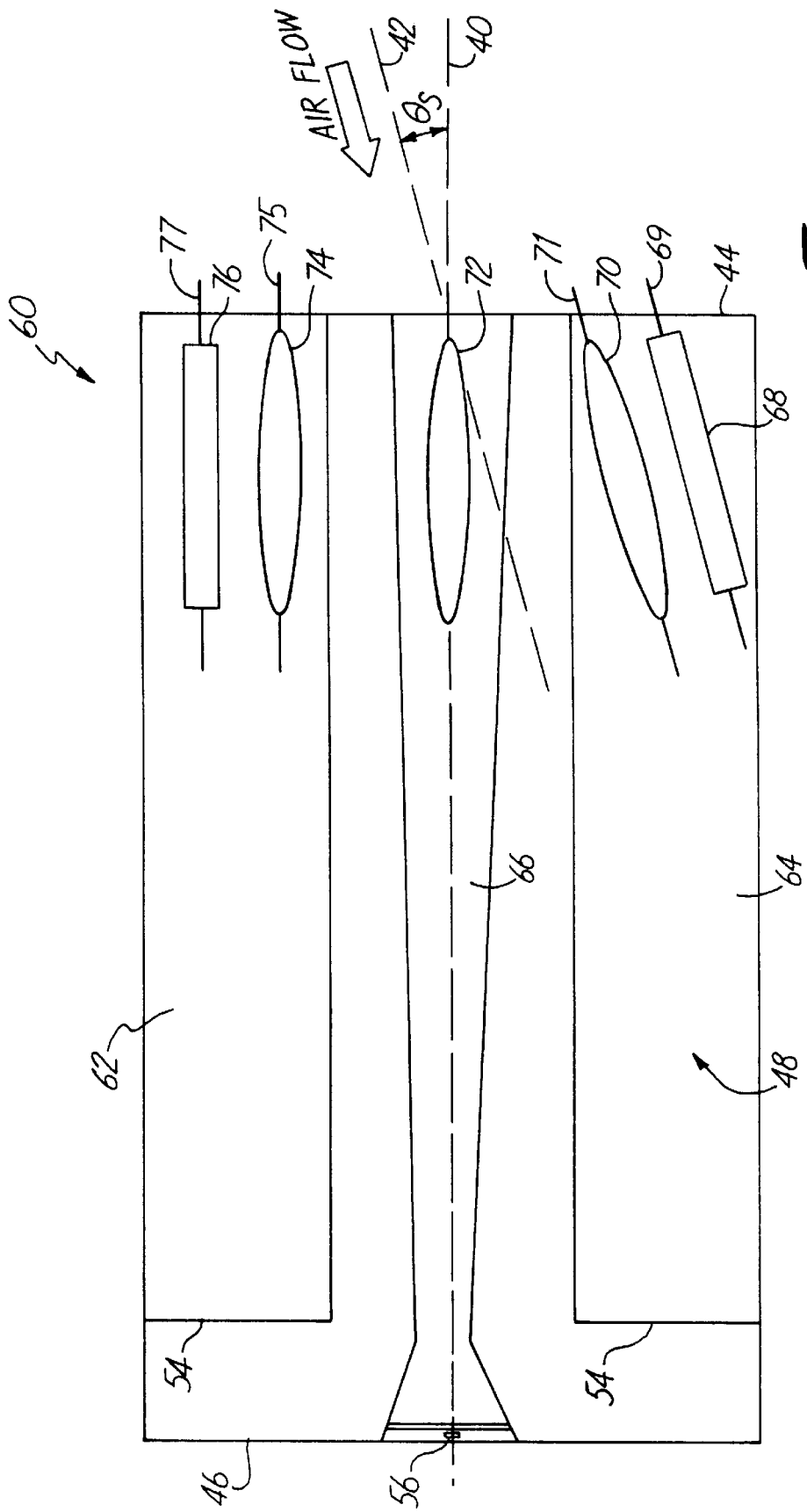
FIG. 4 is an air bearing surface view of the head slider illustrated in FIG. 3 in accordance with some embodiments of the present invention.

FIG. 4 is a diagrammatic ABS view of head slider 60 in accordance with preferred embodiments of the present invention. Head slider 60 incorporates the features of head slider 26, but adds additional features in accordance with preferred embodiments of the present invention. As can be seen in FIG. 4, head slider 60 includes leading edge 44, trailing edge 46 and ABS 48. Head slider 60 also includes outer rail 62, inner rail 64 and center rail 66. Rails 62, 64 and 66 form a substantial portion of ABS 48 of head slider 60. Inner rail 64 is the rail which is closest to inner diameter 36 of disc 16 while head slider 60 is at rest on surface 52. Preferably, head slider 60 is substantially symmetric about center line 40. Head slider 60 is illustrated with tangent 42 forming skew angle $\theta_S$ relative to center line 40, signifying a position of head slider 60 at or near inner diameter 36. Thus, with head slider 60 in a static position on the surface of disc 16, the direction of air flow is substantially along tangent 42 when disc 16 begins to rotate.

As illustrated in FIG. 4, head slider 60 includes a number of leg members on the rails of the slider near leading edge 44. Leg members 68 and 70 extend longitudinally along axes 69 and 71, respectively, on inner rail 64. Leg member 72 extends longitudinally along center line 40 on center rail 66. Leg members 74 and 76 extend longitudinally along axes 75 and 77, respectively, on outer rail 62. Leg members 68, 70, 72, 74 and 76 preferably elevate leading edge 44 above surface 52 of disc 16 by between about 4 μinches and about 12 μinches. The longitudinal or lengthwise extending nature of the features of the leg members helps to channel or redirect air flow toward portions of ABS 48 near trailing edge 46 in order to allow head slider 60 to take-off at lower disc rotational speeds than would otherwise be possible.

A particularly advantageous feature of head slider 60 is that axes 69 and 71, along which leg members 68 and 70 extend on inner rail 64, are oriented parallel to the direction of air flow (i.e., to tangent 42) in order to increase the air flow provided to ABS 48 during take-off of head slider 60. Leg members 72, 74 and 76 can be oriented parallel to center line 40 in order to redirect air flow toward ABS 48 during take-off, and to minimize the effect of the leg members on flying performance of head slider 60 after take-off.

Figure 5:
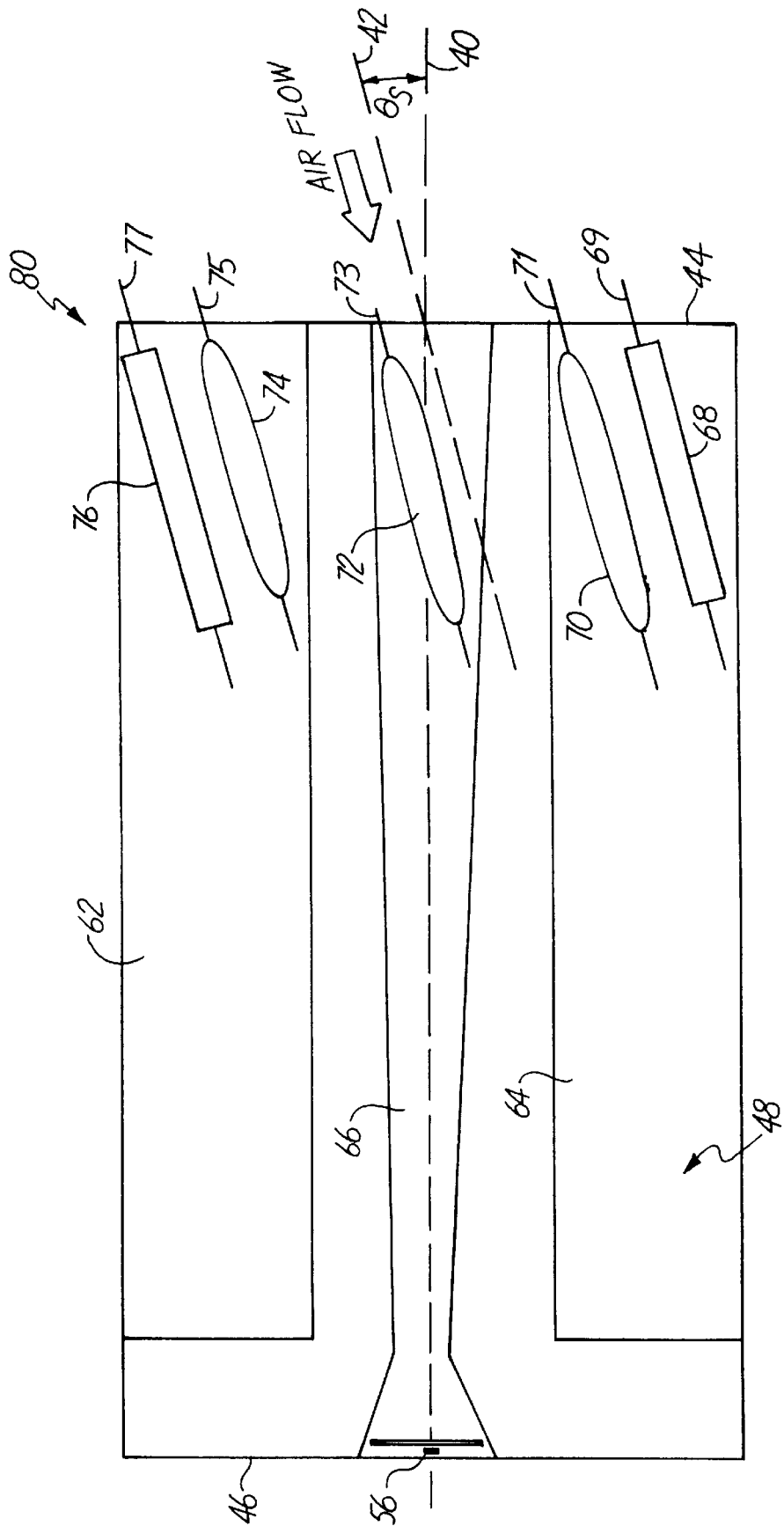
FIG. 5 is an air bearing surface view of the head slider illustrated in FIG. 3 in accordance with alternate embodiments of the present invention.

FIG. 5 is a diagrammatic ABS view of head slider 80 in accordance with alternate embodiments of the present invention. Head slider 80 is preferably identical to head slider 60 with the exception of the orientation of leg members 72, 74 and 76. As illustrated in FIG. 5, axes 73, 75 and 77 along which leg members 72, 74 and 76 respectively extend are also oriented such that they are parallel to the direction of air flow (i.e., to tangent 42) while head slider 80 is positioned near inner diameter 36 prior to take-off. Thus, potentially even more air flow will be provided to ABS 48 for use in take-off. However, in the configuration of FIG. 5, the orientation of the leg members may increase the effect that the leg members have on flying performance after take-off.

Leg members 68, 70, 72, 74 and 76 can be formed on the rails of head sliders 60 and 80 using several techniques. For example, they can be formed using a photo-mask to define the geometry of these features, followed by ion milling the non-covered portions of the ABS. After lift-off of the photomask, the leg members would remain. In the alternative, photoresist material can be placed on the ABS everywhere but at the desired locations of the leg members. Then, after deposition of a layer of material across the ABS, the photoresist can be removed leaving only the portions of the layer which form the leg members. Thus, unlike some conventional ABS designs, the ABS design of the present invention requires no taper forming steps and is therefore easy to implement.

Figure 6:
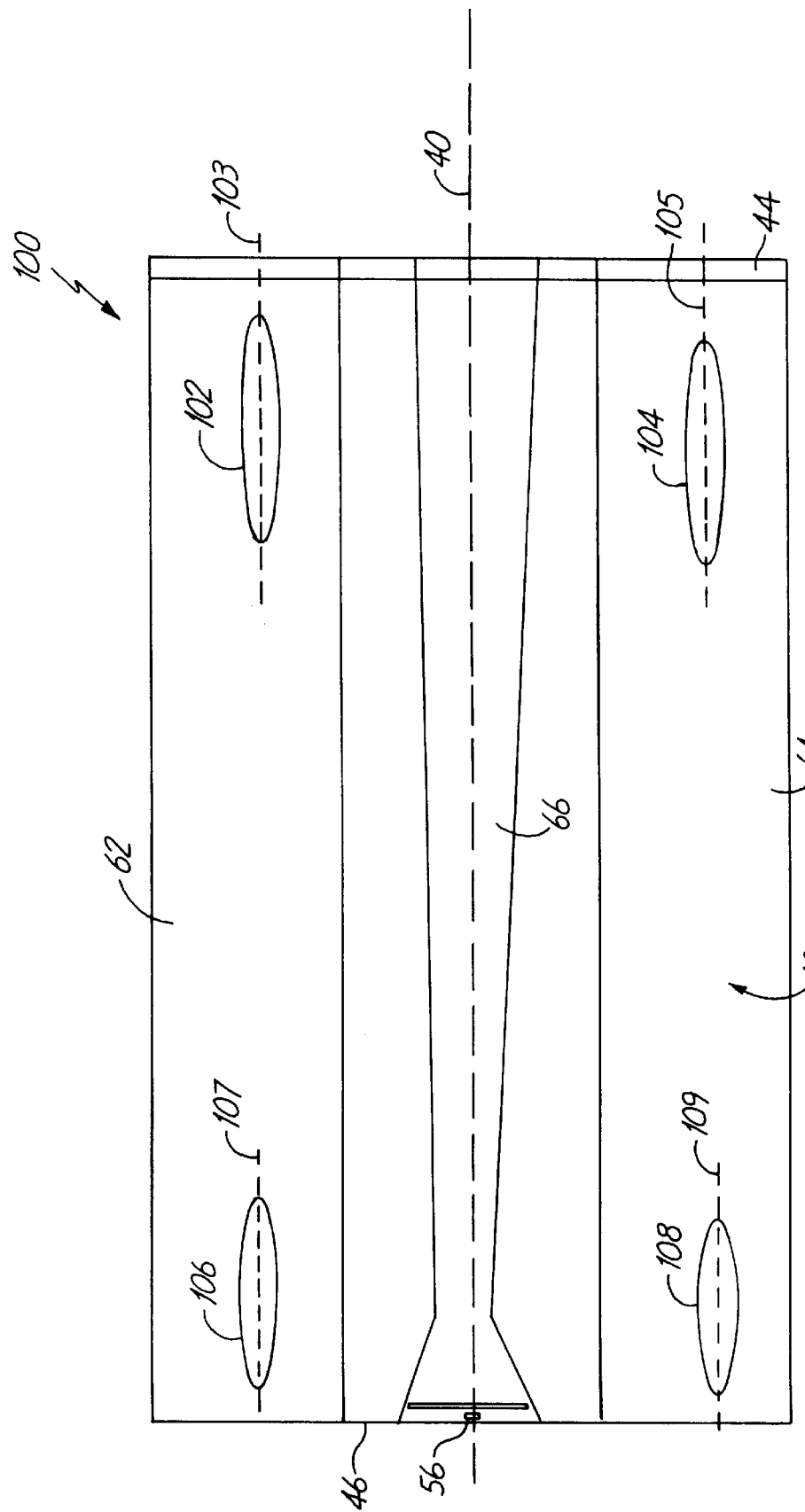
FIG. 6 is an air bearing surface view illustrating a head slider in accordance with still other embodiments of the present invention.

FIG. 6 is an air bearing surface view illustrating head slider 100 in accordance with other preferred embodiments of the present invention. As shown in FIG. 6, head slider 100 has first and second leg members 102 and 104 protruding or extending from ABS 48 adjacent leading edge 44. As illustrated, leading edge 44 is a stepped leading edge. However, leading edge 44 can also be a tapered or taperless leading edge. Each of leg members 102 and 104 are positioned on a different side of center line 40. Head slider 100 also has third and fourth leg members 106 and 108 protruding from ABS 48 adjacent trailing edge 46 on opposite sides of center line 40. Leg members 106 and 108 are preferably formed on ABS 48 about 10 milli-inches from trailing edge 46 and such that they extend from the ABS toward the disc surface by between about 1 μinch and 3 μinches. Leg members 102 and 104 preferably extend from ABS 48 toward the disc surface by an amount or distance which is sufficiently greater than that of leg members 106 and 108 to give head slider 100 a desired static pitch angle $\theta_{SP}$ relative to the surface of the disc while the disc is at rest. In preferred embodiments, leg members 102 and 104 extend from ABS 48 by up to about 8 μinches.

As illustrated in FIG. 6, in preferred embodiments of head slider 100, the leg members extend longitudinally along an axis in order to improve the aerodynamic properties of the head slider during takeoff and normal flying conditions. As such, leg members 102, 104, 106 and 108 extend longitudinally along the respective ones of axes 103, 105, 107 and 109. As shown, each of axes 103, 105, 107 and 109 can be oriented such that it is substantially parallel to center line 40.

Figure 7:
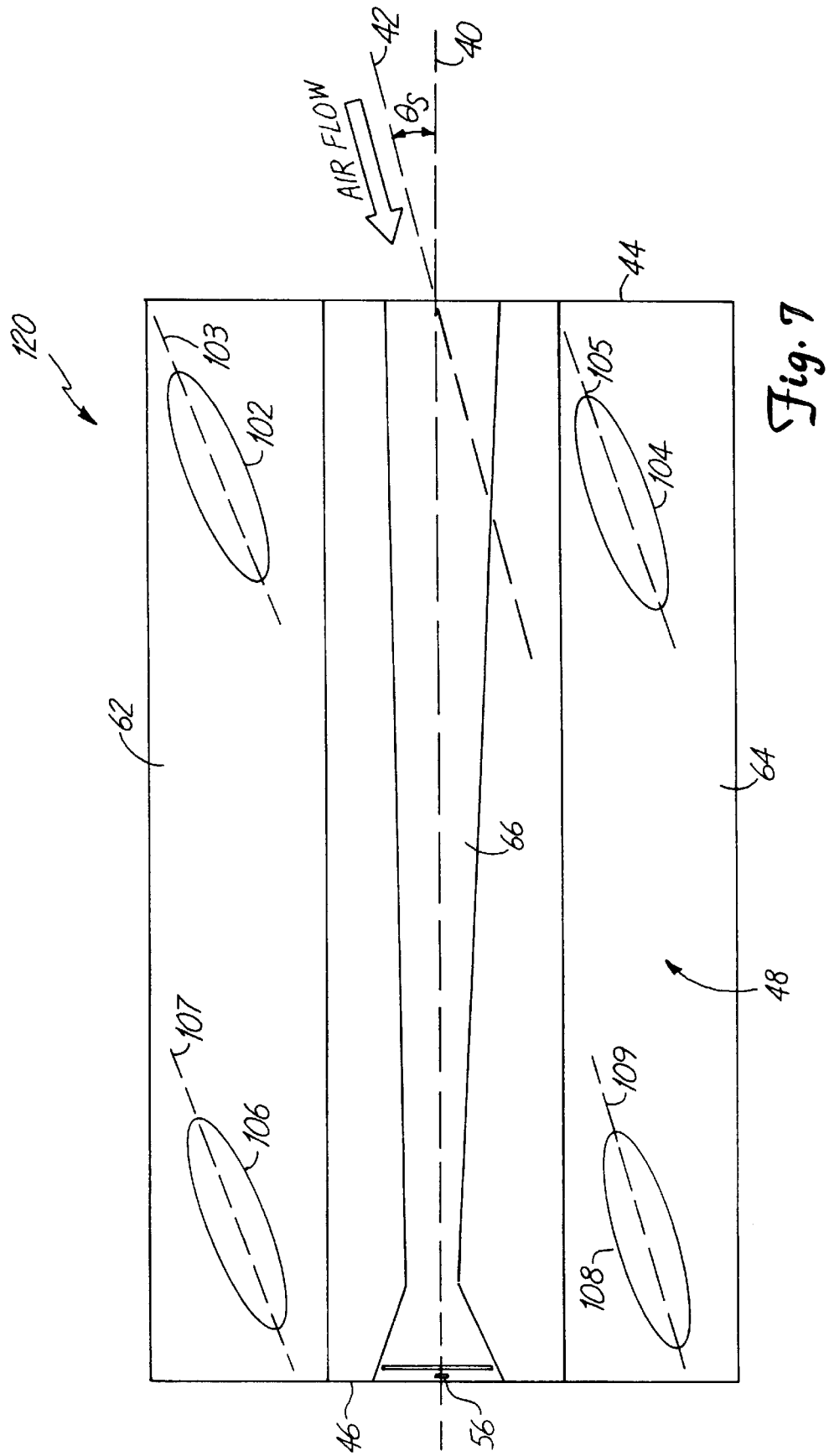
FIG. 7 is an air bearing surface view illustrating a head slider in accordance with still other embodiments of the present invention.

FIG. 7 illustrates head slider 120 which is substantially identical to head slider 100 with the exceptions of the orientation of the axes along which the leg members extend and the type of air bearing surface/leading edge interface. Unlike FIG. 6, head slider 120 is shown to have a taperless air bearing surface without a stepped leading edge. However, the features of head slider 120 can be used with a stepped leading edge as well. As illustrated in FIG. 7, each of axes 103, 105, 107 and 109 can extend parallel to the direction of air flow (i.e., to tangent 42) while head slider 120 is positioned near inner diameter 36 of the disc prior to take-off. Thus, potentially even more air flow will be provided to ABS 48 for use in take-off. While in FIG. 7 each of leg members 102, 104, 106 and 108 is illustrated as being parallel to the direction of air flow, in other embodiments, some of the leg members will be oriented parallel to the direction of air flow near inner diameter 36, while others will be oriented parallel to center line 40 as a tradeoff so that takeoff and normal fly performance will both be improved.

Figure 8:
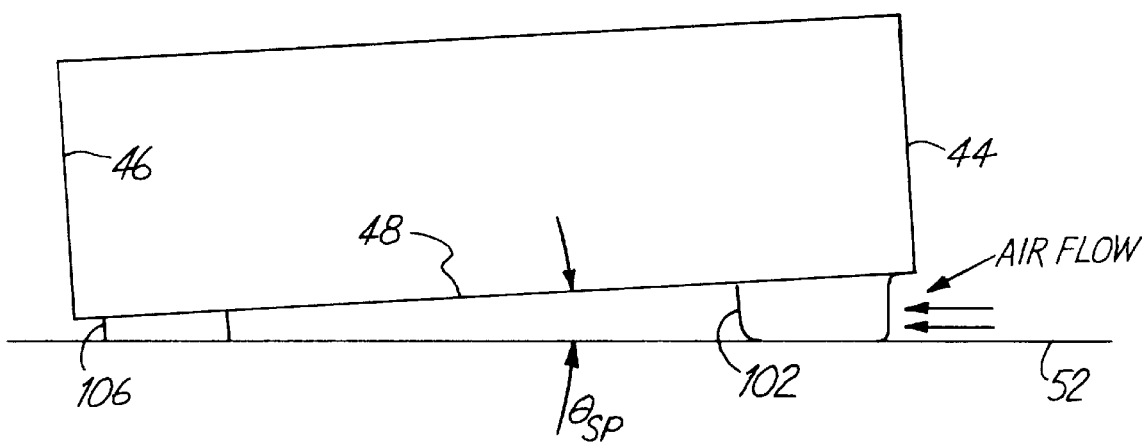
FIG. 8 is a side view of the head sliders of the present invention illustrated in either of FIGS. 6 and 7.

FIG. 8 is a side diagrammatic view of the head sliders of the present invention illustrated in either of FIGS. 6 and 7. The specific type of air bearing surface/leading edge interface is not intended to be shown (i.e., tapered, taperless, stepped leading edge). The head sliders illustrated in FIGS. 6–8 provide the benefits of the head sliders illustrated in FIGS. 3–5, with the added benefit of reduced stiction as a result of the trailing edge also being lifted above the surface of the disc while the disc is at rest. By elevating leading edge 44 above surface 52 of the disc by an amount greater than the elevation of trailing edge 46 above surface 52, air flow is permitted between leg members 102 and 104 and against ABS 48. This allows the head sliders to be taperless head sliders if desired. This is highly beneficial and allows ABS 48 of the head sliders to be designed for optimal flying characteristics, and not for enhanced take-off characteristics. However, the head sliders illustrated in FIGS. 6–8 can be used with a tapered ABS. Also, the head sliders illustrated can be used. with stepped leading edges to help in improving the stepped leading edge design by keeping the standard ion milled features from contacting the disc surface.

Figure 9:
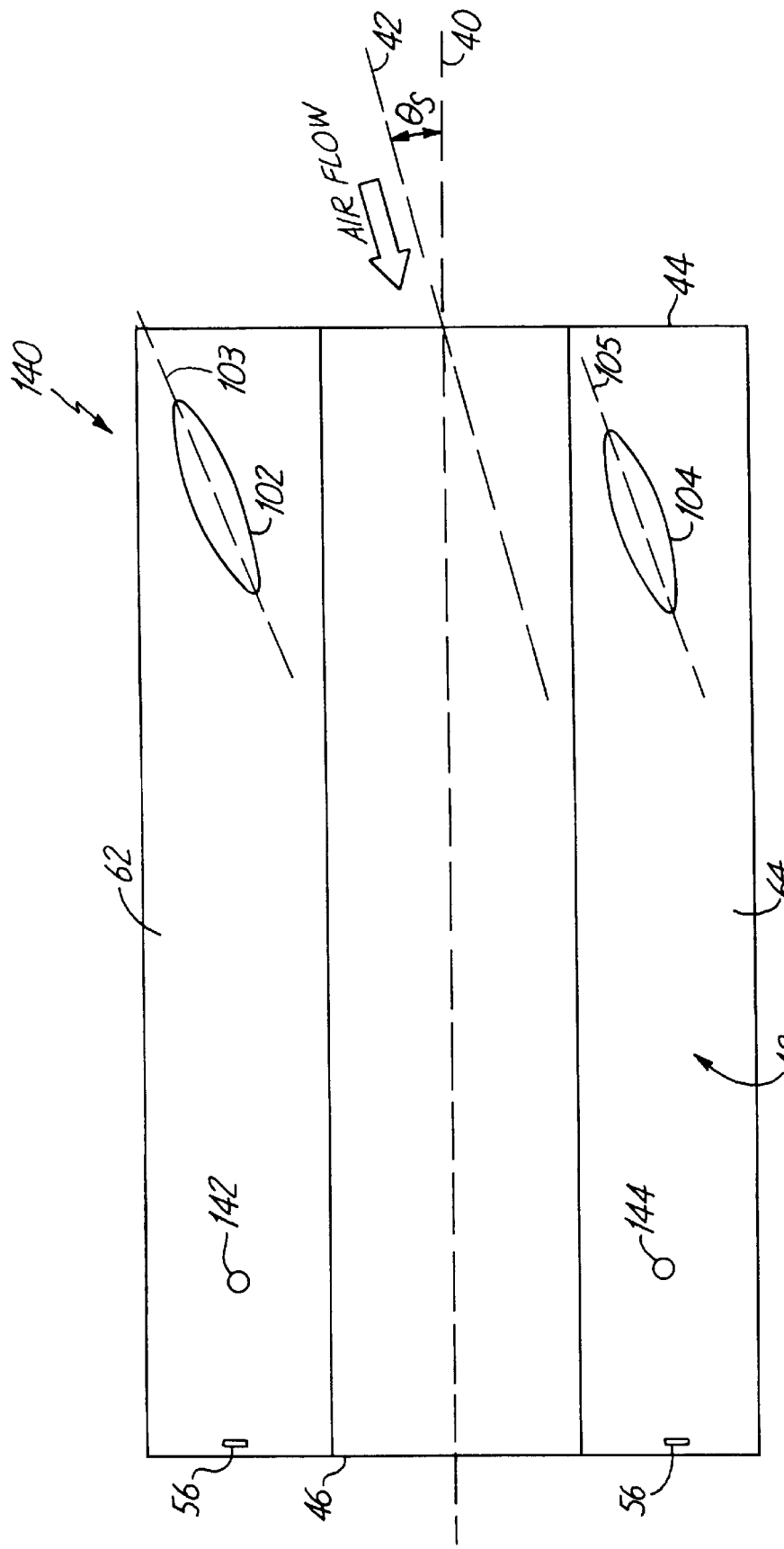
FIG. 9 is an air bearing surface view illustrating a head slider in accordance with still other embodiments of the present invention.
Figure 10:
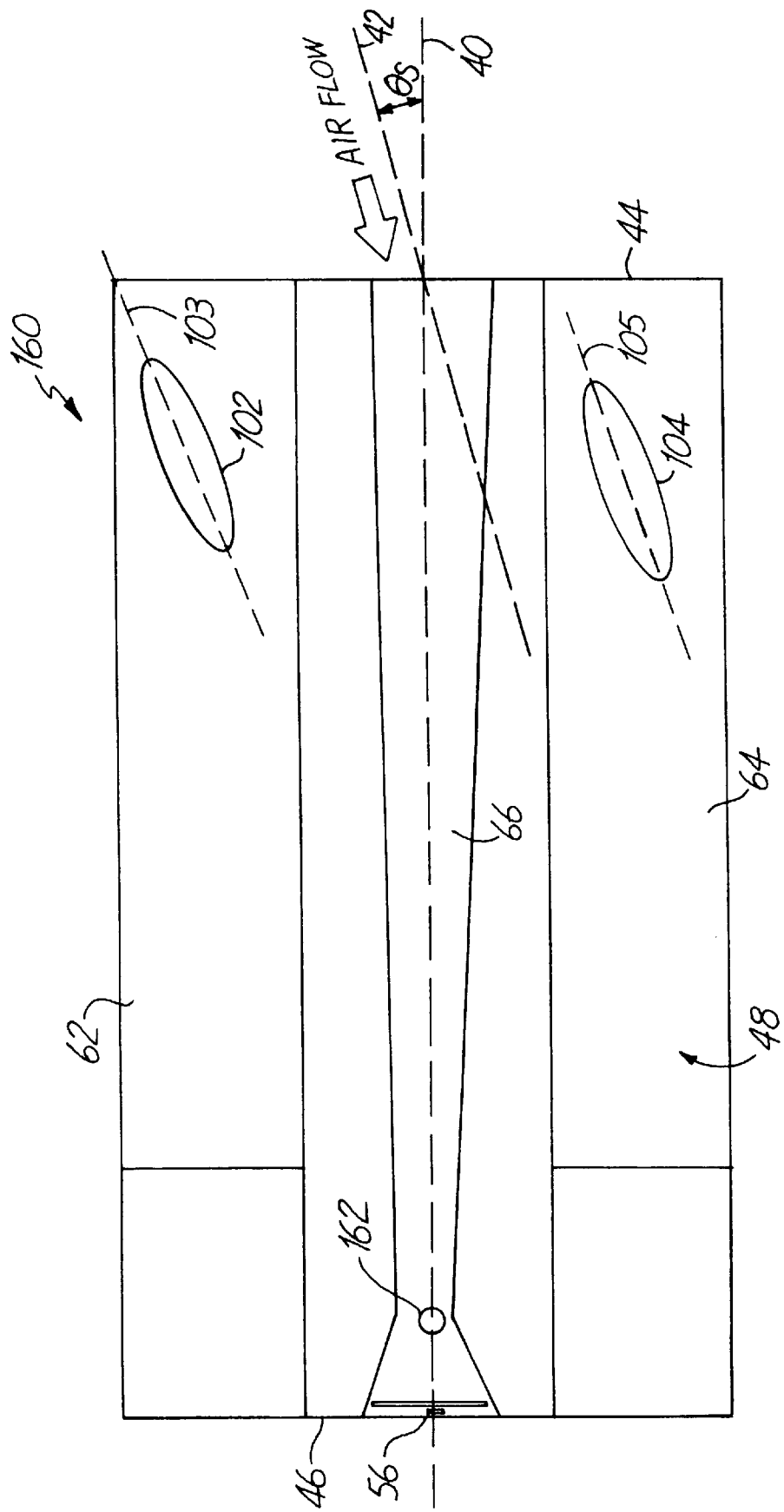
FIG. 10 is an air bearing surface view illustrating a head slider in accordance with still other embodiments of the present invention.

FIGS. 9 and 10 illustrate still further head slider embodiments of the present invention. As shown in FIG. 9, head slider 140 can be identical to head sliders 100 and 120 with the following exceptions. First, head slider 140 is a two rail head slider, and thus lacks center rail 66. Second, instead of longitudinally extending leg members 106 and 108, head slider 140 includes bumps 142 and 144, on rails 62 and 64 respectively. Bumps 142 and 144 protrude from ABS 48 by the same distances as did leg members 106 and 108 in previously discussed embodiments. Thus, ABS 48 of head slider 140 is maintained substantially off of the disc surface, while a static pre-tilt angle is introduced. Also, leg members 102 and 104 can extend longitudinally along axes 103 and 105 in the direction of air flow at the inner diameter of the disc (i.e., oriented to match the skew angle). Head slider 140 has the advantage of bumps 142 and 144 providing a lower contact area with the disc surface, thereby further reducing stiction.

Head slider 160 has a three rail slider body substantially identical to the slider bodies of previously discussed head slider embodiments. Like head slider 140, head slider 160 utilizes bump 162 at the trailing edge end to lower the profile of the rear leg members, while still providing the advantages of the present invention. Head slider 160 differs from head slider 140 in that it has only a single rear bump or leg member positioned on center rail 66. Thus, the contact area between the slider and the disc surface is reduced even further, thereby further reducing stiction. Head sliders 140 and 160 can be used with taperless, tapered or stepped ABS/leading edge interfaces.

The present invention provides numerous advantages over attempts in the prior art to allow more air to enter the ABS region prior to take-off. For example, the present invention eliminates the need for a tapered ABS, thus making the head sliders of the present invention easier to manufacture, and allowing the characteristics of the ABS to be designed for optimal flying performance. Previously, fly performance was typically sacrificed to reduce stiction and enhance take-off performance. The elimination of the need for a taper and the need for stringent crown/camber/twist requirements greatly enhances head slider ABS designs and manufacturability.

Although the present invention has been described with reference to preferred embodiments, workers skilled in the art will recognize that changes may be made in form and detail without departing from the spirit and scope of the invention.

What is claimed is:

1. An air bearing slider for use in a disc drive data storage system in which the slider flies above a surface of the disc as the disc rotates, the disc having an inner diameter and an outer diameter and storing data in concentric data tracks between the inner and outer diameters, the slider comprising:

a trailing edge;

a leading edge;

an air bearing surface opposed to the surface of the disc and having an inner rail and an outer rail on opposite sides of a longitudinally extending center line, the longitudinally extending center line extending from the leading edge to the trailing edge;

a first longitudinally extending leg member protruding normally from the inner rail of the air bearing surface at a leading edge end of the slider on a first side of the center line, the first longitudinally extending leg member extending longitudinally along a first axis; and a second longitudinally extending leg member protruding normally from the outer rail of the air bearing surface at a leading edge end of the slider on a second side of the center line, the second longitudinally extending leg member extending longitudinally along a second axis;

a third longitudinally extending leg member protruding normally from the inner rail of the air bearing surface at a trailing edge end of the slider on the first side of the center line, the third longitudinally extending leg member extending longitudinally along a third axis; and a fourth longitudinally extending leg member protruding normally from the outer rail of the air bearing surface at a trailing edge end of the slider on the second side of the center line, the fourth longitudinally extending leg member extending longitudinally along a fourth axis, wherein the first and second longitudinally extending leg members protrude from the air bearing surface at the leading edge end of the slider by a first distance, and wherein the third and fourth longitudinally extending leg members protrude from the air bearing surface at the trailing edge end of the slider by a second distance, and wherein the first distance is greater than the second distance so that the leading edge end of the slider is elevated above the trailing edge end of the slider while the disc is at rest.

2. The air bearing slider of claim 1, wherein the air bearing surface is a taperless air bearing surface.

3. The air bearing slider of claim 1, wherein at least one of the first, second, third and fourth axes is oriented such that it forms an angle relative to the center line which is substantially equal to the skew angle of the slider when the slider is positioned at the inner diameter of the disc and thereby optimizing air flow to the air bearing surface.

4. The air bearing slider of claim 3, wherein the first and second longitudinally extending leg members protrude from the inner and outer rails, respectively, to the surface of the disc by a distance of about 8 $\mu$inches.

5. The air bearing slider of claim 4, wherein the third and fourth longitudinally extending leg members protrude from the inner and outer rails, respectively, to the surface of the disc by a distance of between about 1 $\mu$inch and about 3 $\mu$inches.

6. The air bearing surface of claim 3, wherein the air bearing surface forms an angle of between about 50 $\mu$rad and about 100 $\mu$rad with a plane parallel to the surface of the disc while the disc is at rest.

7. An air bearing slider for use in a disc drive data storage system in which the slider flies above a surface of the disc as the disc rotates, the disc having an inner diameter and an outer diameter, the slider comprising:

a trailing edge;

a leading edge;

a taperless air bearing surface opposed to the surface of the disc and having an inner rail and an outer rail on opposite sides of a longitudinally extending center line, the longitudinally extending center line extending from the leading edge to the trailing edge;

a first longitudinally extending leg member protruding normally from the inner rail of the air bearing surface to the surface of the disc at a leading edge end of the slider on a first side of the center line, the first longitudinally extending leg member extending longitudinally along a first axis, first axis being parallel to the air bearing the first axis being oriented parallel to a direction of air flow when the slider is positioned at the inner diameter of the disc to thereby optimize air flow to the air bearing surface; and a second longitudinally extending leg member protruding normally from the outer rail of the air bearing surface to the surface of the disc at a leading edge end of the slider on a second side of the center line, the second longitudinally extending leg member extending longitudinally along a second axis, the first and second longitudinally extending leg members protruding from the leading edge end of the slider such that the leading edge end of the slider is elevated above the surface of the disc relative to the trailing edge end of the slider while the disc is at rest, and such that the air bearing surface contacts the surface of the disc only at a corner adjacent the trailing edge and the leg members.

8. The air bearing slider of claim 7, wherein the second axis is substantially parallel to the center line.

9. The air bearing slider of claim 8, wherein the taperless air bearing surface further comprises a center rail extending generally along the center line from the leading edge to the trailing edge, the slider further comprising a third longitudinally extending leg member protruding normally from the center rail at a leading edge end of the slider, the third longitudinally extending leg member extending longitudinally along a third axis, the first, second and third longitudinally extending leg members protruding from the leading edge end of the slider such that the leading edge end of the slider is elevated above the surface of the disc relative to the trailing edge end of the slider while the disc is at rest.

10. The air bearing slider of claim 9, wherein the third axis is substantially co-linear with the center line.

11. The air bearing slider of claim 7, wherein the second axis is substantially parallel to the first axis to thereby optimize air flow to the air bearing surface.

12. The air bearing surface of claim 7, wherein the first and second longitudinally extending leg members protrude from the inner and outer rails to the surface of the disc, respectively, by a distance of between about 4 $\mu$inches and about 12 $\mu$inches.

13. The air bearing surface of claim 7, wherein the first and second longitudinally extending leg members protrude from the inner and outer rails such that the air bearing surface forms an angle with the surface of the disc of between about 50 $\mu$rad and about 100 $\mu$rad.

14. An air bearing slider for use in a disc drive data storage system in which the slider flies above a surface of the disc as the disc rotates, the disc having an inner diameter and an outer diameter and storing data in concentric data tracks between the inner and outer diameters, the slider comprising:

a trailing edge;

a leading edge;

an air bearing surface opposed to the surface of the disc and having an inner rail and an outer rail on opposite sides of a longitudinally extending center line, the longitudinally extending center line extending from the leading edge to the trailing edge, the air bearing surface also having a center rail disposed along the center line;

a first longitudinally extending leg member protruding normally from the inner rail of the air bearing surface at a leading edge end of the slider on a first side of the center line, the first longitudinally extending leg member extending longitudinally along a first axis; and a second longitudinally extending leg member protruding normally from the outer rail of the air bearing surface at a leading edge end of the slider on a second side of the center line, the second longitudinally extending leg member extending longitudinally along a second axis;

a third leg member protruding normally from the center rail of the air bearing surface at a trailing edge end of the slider, wherein the first and second longitudinally extending leg members protrude from the air bearing surface at the leading edge end of the slider by a first distance, and wherein the third leg member protrudes from the air bearing surface at the trailing edge end of the slider by a second distance, and wherein the first distance is greater than the second distance so that the leading edge end of the slider is elevated above the trailing edge end of the slider while the disc is at rest.

15. The air bearing slider of claim 14, wherein the air bearing surface is a taperless air bearing surface.

16. The air bearing slider of claim 14, wherein at least one of the first and second axes is oriented such that it forms an angle relative to the center line which is substantially equal to the skew angle of the slider when the slider is positioned at the inner diameter of the disc and thereby optimizing air flow to the air bearing surface.

17. The air bearing slider of claim 16, wherein the first and second longitudinally extending leg members protrude from the inner and outer rails, respectively, to the surface of the disc by a distance of about 8 $\mu$inches, and wherein the third leg member protrudes from the center rail of the air bearing surface to the surface of the disc by a distance of between about 1 $\mu$inch and about 3 $\mu$inches.

18. The air bearing surface of claim 17, wherein the air bearing surface forms an angle of between about 50 $\mu$rad and about 100 $\mu$rad with a plane parallel to the face of the disc while the disc is at rest.

* * * * *